June 5, 1945.　　　　F. E. FREY　　　　2,377,412
PRODUCTION OF CYCLOPENTANONE
Filed June 13, 1944
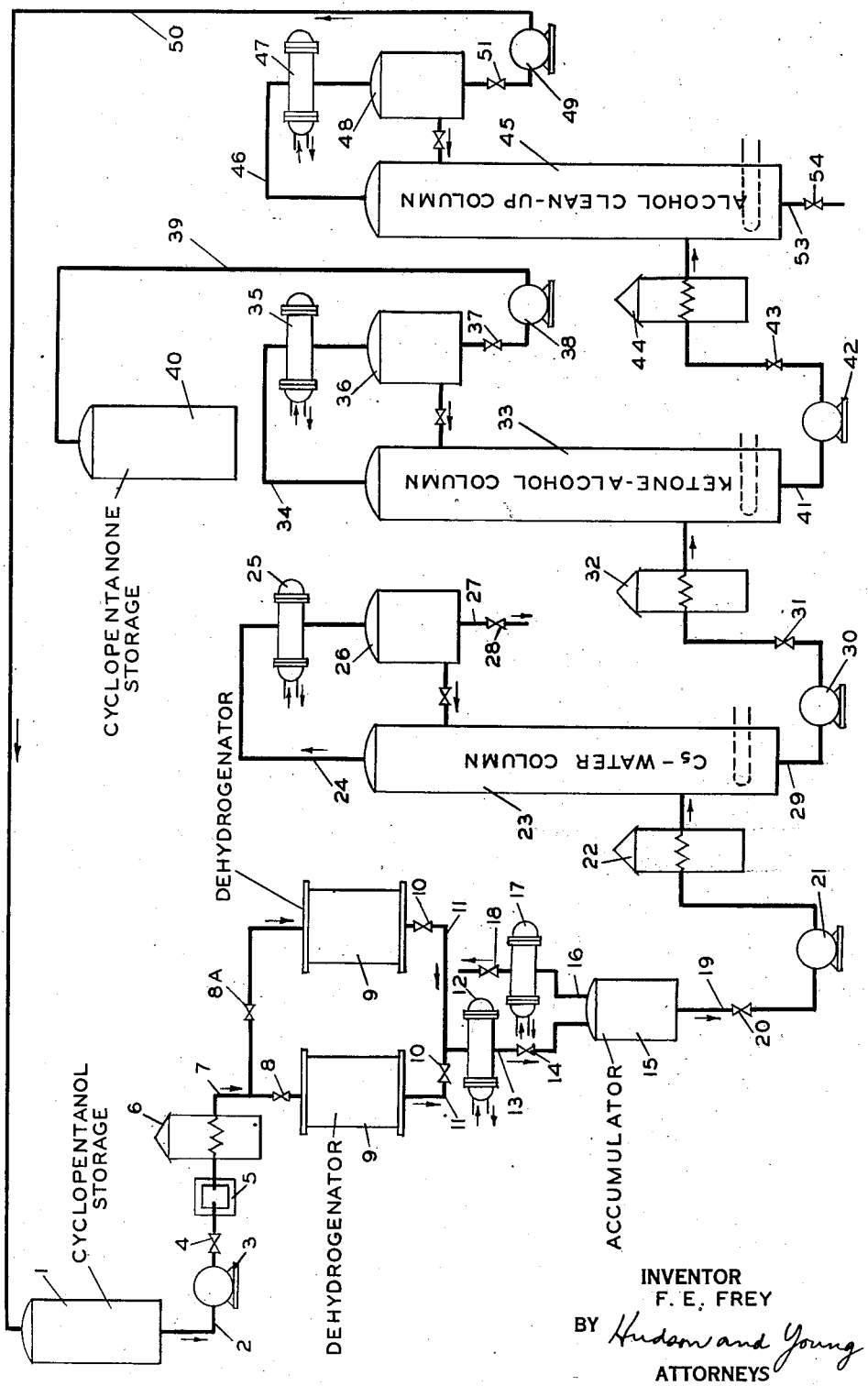
INVENTOR
F. E. FREY
BY Hudson and Young
ATTORNEYS Patented June 5, 1945

2,377,412

UNITED STATES PATENT OFFICE 2,377,412

PRODUCTION OF CYCLOPENTANONE

Frederick E. Frey, Bartlesville, Okla., assignor to Phillips Petroleum Company, a corporation of Delaware Application June 13, 1944, Serial No. 540,076

4 Claims. (Cl. 260—586)

The present invention relates to cyclopentanone (ketopentamethylene or adipic ketone) and more particularly to a process for the production of cyclopentanone by the catalytic dehydrogenation of cyclopentanol. In one of its more specific aspects, the invention relates to the dehydrogenation of cyclopentanol in the presence of a specified copper-zinc alloy catalyst within a specified temperature range and under specified reaction conditions.

Cyclopentanone is a valuable normally liquid organic compound which is used as an intermediate in the production of explosives, as an industrial solvent, as a solvent and softener for certain synthetic resins and as an intermediate for organic syntheses. It also possesses other potential industrial utility.

Cyclopentanol can be converted to cyclopentanone by oxidation in liquid phase with chromic acid (Demjanov, J. Russ. Phys. Chem. Soc., 1910, vol. 42, page 850). Such a method is not commercially feasible because of the high initial cost of the oxidizing mixture and the problem of disposing of the spent acid. Other oxidizing agents, such as dilute nitric acid, carry the oxidation past the ketone stage and break the cyclopentane or pentamethylene ring, producing glutaric acid as the major product together with smaller proportions of other dibasic acids such as succinic acid. Vapor-phase oxidation with oxygen or air in the presence of suitable catalysts is a process not readily capable of control to produce only the desired cyclopentanone. Catalytic dehydrogenation of cyclopentanol to produce cyclopentanone in the presence of a hydrogen acceptor such as cyclopentadiene and in the presence of a copper or other hydrogenation-dehydrogenation catalyst has been described in the copending application of James H. Boyd, Jr., Serial No. 456,822, filed August 31, 1942. This latter process is useful in that it permits the conversion of cyclopentadiene to cyclopentene, which can then be hydrated to cyclopentanol and the latter converted to cyclopentanone.

Cyclopentanol has been prepared by various methods but it has not heretofore been possible to prepare it readily from petroleum or cyclopentane. Cyclopentene is readily hydrated to cyclopentanol in the presence of sulfuric acid (Demjanov, J. Russian Phys. Chem. Soc., 1910, vol. 42, page 850) but cyclopentene is not present in substantial amounts in petroleum nor is it readily obtained by dehydrogenation of cyclopentane, which is present in petroleum in substantial proportions, without the formation of cyclopentadiene. When cyclopentane is dehydrogenated, cyclopentadiene and cyclopentene are formed in approximately equal proportions (cf. Frey, Industrial and Engineering Chemistry, 1934, vol. 26, page 198). The dehydrogenation of cyclopentane to produce cyclopentadiene is described in the following U. S. patents: Grosse, 2,157,202; Grosse et al., 2,157,203; and Morrell, 2,157,939. The process of the Boyd application referred to hereinabove is important in that, in one of its aspects, it provides a method for the conversion of cyclopentane from petroleum to cyclopentanol by the dehydrogenation of cyclopentane to cyclopentadiene and utilization of the latter as a hydrogen acceptor in the cyclopentanol to cyclopentanone conversion, whereby the cyclopentadiene is converted to cyclopentene; the cyclopentene is then available for conversion to cyclopentanol by hydration.

Cyclopentene, and consequently cyclopentanol, can now be produced from cyclopentane from petroleum or other sources. In accordance with one of these methods, cyclopentane is dehydrogenated to cyclopentadiene and this compound is then hydrogenated under specified conditions to yield cyclopentene while limiting cyclopentane. Such a process is described in the copending application of Gardner C. Ray, Serial No. 493,688, filed July 6, 1943. Cyclopentene can also be produced as a substantial product of the catalytic pyrolysis of cyclopentane in the presence of substantial amounts of hydrogen, in accordance with the process described in the application of Harold J. Hepp, Serial No. 540,070, filed on even date herewith.

It is an object of this invention to provide a process for the conversion of cyclopentanol to cyclopentanone by vapor-phase catalytic dehydrogenation.

Another object of the invention is to provide a process for converting cyclopentanol to cyclopentanone without concomitant dehydration reactions that produce cyclopentene or undesirable products.

Still another object of the invention is to provide a catalyst for effecting the dehydrogenation of cyclopentanol in vapor phase to cyclopentanone without the formation of substantial amounts of undesirable byproducts.

Other objects and advantages, some of which are referred to hereinafter, will be obvious to those skilled in the art to which the invention pertains.

In accordance with the invention, cyclopentanol is passed in vapor phase over a copper-zinc alloy, such as brass, at a temperature within the range of approximately 250° to approximately 375° C. and preferably between approximately 290° and 340° C., at a flow rate within the range specified hereinafter.

I have discovered that copper-zinc alloys possess a desirable combination of properties which make their use as catalysts in the particular conversion eminently desirable. In comparison with other metal catalysts, such as those disclosed in the copending application of James H. Boyd, Jr., that was referred to hereinabove, when used without cyclopentadiene or other hydrogen acceptor, copper-zinc alloys possess a number of unexpected advantages. Copper-zinc alloys, such as brass, catalyze the conversion of cyclopentanol to cyclopentanone at much lower temperatures than does copper. The conversion per pass with copper catalysts at these high temperatures is low. Nickel, when used as a catalyst, appears to favor dehydration side reactions whereby cyclopentene is produced in substantial amounts.

The space velocity, that is, the number of cc. of cyclopentanol vapor at normal temperature and pressure (0° C. and 760 mm.) which are passed over 1 cc. of the catalyst per minute, may be varied from approximately 1.0 to approximately 3.0 in the practice of the invention. The optimum space velocity for any particular operation will be determined by the conversion temperature being maintained, the nature and composition of the catalyst and its previous history. The effect of certain of these factors is illustrated in the results hereinafter disclosed.

The process of the invention may be performed in batchwise, intermittent or continuous manner. In the accompanying drawing, which is a diagrammatic flow sheet, is represented a process for the continuous production of cyclopentanone from cyclopentanol, which constitutes a preferred embodiment of the present invention.

Cyclopentanol from storage tank 1 is led through conduit 2 by pump 3 through control valve 4 and meter 5 into preheater 6, where the alcohol is preheated to a temperature within the range of approximately 250° to approximately 375° C. From the preheater 6 the vapors are led through conduit 7 through valve 8 or 8a to either of the dehydrogenators 9, which are operated at a temperature within the range of approximately 250° to approximately 375° C. and at atmospheric or slightly higher pressure. The dehydrogenation effluent from either dehydrogenator 9 is led through valve 10 and conduit 11 to condenser 12, thence through conduit 13 and valve 14 into accumulator 15. The hydrogen produced is vented through conduit 16 and condenser 17, which is controlled by pressure-control valve 18. The liquid in accumulator 15 is conveyed through conduit 19, controlled by valve 20, by means of pump 21 through feed preheater 22 into column 23, where any cyclopentene and water are taken overhead through conduit 24, condensed in condenser 25 and collected in accumulator 26, which may be drained by conduit 27 controlled by valve 28. The kettle product from column 23, consisting principally of cyclopentanone, cyclopentanol, and small amounts of polymer, is pumped through conduit 29 by means of pump 30, controlled by valve 31, and feed preheater or cooler 32 into fractionating column 33. In fractionating column 33, cyclopentanone is taken overhead through conduit 34 into condensed 35 and collected in accumulator 36. By means of pump 38, the condensate in accumulator 36 is led through conduit 39, controlled by valve 37, and sent to cyclopentanone tank 40 for storage. The kettle product of column 33, consisting principally of cyclopentanol and small amounts of polymer is led through conduit 41 by means of pump 42, controlled by valve 43, into fractionating column 45. Preheater 44 is provided to heat the feed or charge to column 45. Cyclopentanol is taken off as overhead product of column 45, led through conduit 46 to condenser 47 and into accumulator 48. This cyclopentanol is recycled to the alcohol storage tank 1 by means of pump 49 through conduit 50 controlled by valve 51. The residue from column 45, consisting chiefly of high-boiling polymers, is drained from column 45 through conduit 53 controlled by valve 54. The preheaters 22, 32 and 44 may be coolers in the event that the kettle products of the respective columns are at a higher temperature than is desired for operation in the succeeding distillation apparatus.

The catalysts which are used in accordance with the invention are copper-zinc alloys (brasses) containing from approximately 30 to approximately 70 per cent of copper and approximately 70 to approximately 30 per cent of zinc, together with traces or minor proportions of other metals such as tin, lead, nickel, chromium, magnesium, aluminum and the like. The catalyst may be in the form of turnings, granules or shot, screens, wire segments or spirals or in other conventional forms. It is preferably used without a carrier or support but such materials may be used if desired. A suitable catalyst, whose use is described in the examples which follow, is a brass having the following composition:

| | Per cent by weight |
|---|---|
| Copper | 66.02 |
| Zinc | 32.94 |
| Lead | 0.99 |
| Tin | 0.05 |
| Nickel | Trace |

The following examples illustrate the results obtained when brass is used as a catalyst for the dehydrogenation of cyclopentanol to cyclopentanone in accordance with the process of my invention:

EXAMPLE I

Pure cyclopentanol was forced from a burette by means of nitrogen under pressure through a flow meter to a preheater and vaporized. The vapors were led at atmospheric pressure over a catalyst bed composed of 88 grams of yellow brass turnings of 8 to 10-mesh size having the following composition in per cent by weight: Cu 66.02; Zn 32.94; Pb 0.99; Sn 0.05; Ni trace. This catalyst bed was contained in a pyrex glass tube having an internal diameter of 19 mm., packed to a depth of 30 cm. and heated by an electric furnace. The dehydrogenation effluent was led through a trap cooled in ice, followed by one cooled in dry ice. The hydrogen was vented and the condensed liquid products were recovered and analyzed.

The following conditions were maintained:

Conditions

| | |
|---|---|
| Time, minutes | 157 |
| Charge from burette, cc. of cyclopentanol | 82.1 |
| Catalyst temperature, °C | 300 to 320 |
| Pressure, atmosphere | 1 |
| Average flow rate, liquid cc./minute | 0.52 |
| Space velocity, cc. cyclopentanol vapor at NTP/cc. catalyst/min | 1.5 |
| Liquid products recovered, cc | 81.1 |
| Loss, vol. % | 1.3 |
| Index of refraction of effluent ($n_D^{20}$) | 1.4393 |

A 74-cc. aliquot portion of the effluent was distilled in a packed column having an efficiency equivalent to approximately five theoretical plates. The following data were obtained:

| Fraction | B. P., °C. | Distillate, cc. |
|---|---|---|
| 1 | Up to 127 | 1.4 (0.4 cc. H₂O). |
| 2 | 127 to 130.5 | 68.2. |
| 3 | Over 130.5 | 1.4. |

It will be seen that the amount of water produced represented only 0.5 volume per cent of the total effluent. Fraction 2 contained 62 grams of cyclopentanone as shown by analysis (as dibenzalcyclopentanone). This corresponds to 88 volume per cent cyclopentanone based on the total liquid effluent from the dehydrogenation. The yield data were as follows:

Yields

Cyclopentanone in effluent based on index of refraction, vol. % _____ 84
Cyclopentanone in effluent based on gravimetric analysis as dibenzalcyclopentanone, vol. % _____ 88
Per-pass conversion, % of theory _____ 89

EXAMPLE II

The same catalyst, apparatus, and operating technique were used as in preceding Example I, with the following reaction conditions being maintained. The yields were as indicated.

Conditions

Time, minute _____ 28
Charge from burette, cc. cyclopentanol ___ 16.0
Catalyst temperature, °C _____ 295 to 307
Average flow rate, liquid cc./minute _____ 0.57
Pressure, atmospheres _____ 1.0
Space velocity, cc. cyclopentanol vapor at NTP/cc. catalyst/min _____ 1.7
Liquid products recovered, cc _____ 15.1
Loss, vol. % _____ 5.6
Index of refraction of effluent ($n_D^{20}$) ____ 1.4383

Yields

Cyclopentanone in effluent based on index of refraction, vol. % _____ 90
Cyclopentanone in effluent based on gravimetric analysis as dibenzalcyclopentanone, vol. % _____ 90
Per-pass conversion, % of theoretical ____ 87

The results tabulated on the accompanying table are those obtained with the same brass catalyst described in Examples I and II. The apparatus and amount of catalyst were identical with those described in Examples I and II. The table illustrates the effects that are obtained by varying the conversion temperatures and flow rates and activity of the catalyst. It may be said that within the range of approximately 290° to 340° C. and with space velocities of approximately 1.0 to 3.0, yields of cyclopentanone within the range of approximately 65% to 90% or higher of the theoretical yield may be obtained, dependent upon the activity of the particular catalyst which is used. Substantially no conversion is obtained below approximately 250° C. at reasonable flow rates. It is to be noted that the previous history of the catalyst, that is, its activity, is substantially as important as the conversion temperature and flow rate, within the ranges specified.

| Temperature range °C. | Average flow liquid cc./min. | Space velocity [1] | $N_D^{20}$ | Cyclopentanone per cent of effluent [2] | Catalyst |
|---|---|---|---|---|---|
| 297 to 310 | 0.92 | 2.7 | 1.4424 | 65 | Fresh. |
| 299 to 320 | 0.55 | 1.6 | 1.4416 | 70 | Do. |
| 306 to 337 | 0.47 | 1.4 | 1.4402 | 78 | Partially depleted. |
| 300 to 320 | 0.52 | 1.5 | 1.4393 | 84 | Ex. I (fresh). |
| 299 to 310 | 0.69 | 2.0 | 1.4391 | 85 | Fresh. |
| 306 to 340 | 0.40 | 1.2 | 1.4390 | 85.5 | Substantially depleted. |
| 295 to 307 | 0.57 | 1.7 | 1.4383 | 90 | Ex. II (fresh). |

[1] The space velocity is computed as the cc. of cyclopentanol vapor at normal temperature and pressure that is passed over 1 cc. of the catalyst per minute.
[2] The cyclopentanone content of the effluent is computed as liquid volumetric per cent, determined from the index of refraction of the effluent; this index is very materially affected by the presence of traces of water in the effluent.

In the following comparative experiments, copper and nickel were used separately as catalysts to dehydrogenate cyclopentanol to cyclopentanone.

COMPARATIVE EXPERIMENTS I AND II

Copper chips of 8 to 10-mesh size were substituted for the brass turnings in the apparatus described in Example I, and an experiment was conducted in the manner previously described. It was found necessary to increase the catalyst temperature to 550° C. to obtain reasonable conversion. The data obtained are tabulated below:

| | Experiment No. | |
|---|---|---|
| | I | II |
| Time, minutes | 30 | 51 |
| Catalyst temperature, °C | 494 to 517 | 550 |
| Cyclopentanol charged, cc | 14.6 | 12 |
| Liquid flow rate, cc./min | 0.49 | 0.23 |
| Pressure, atmospheres | 1.0 | 1.0 |
| Water produced, cc | None | None |
| Cyclopentanone in effluent (det'd as dibenzalcyclopentanone), wt. percent | 2 | 28 |

COMPARATIVE EXPERIMENT III

Cyclopentanol was introduced dropwise at a measured rate from a burette into a catalyst bed of reduced non-pyrophoric nickel. This catalyst was contained in a pyrex tube surrounded by an electric furnace. The catalyst bed was 6 cm. deep and 3 cm. in diameter. The reactor and catalyst were baked several hours at 250° C. in a nitrogen stream to remove water before using.
The experimental data were as tabulated below:

Pressure, atmospheres _____ 1.0
Cyclopentanol charged, grams _____ 10.5
Temperature of catalyst, °C _____ 230–260
Flow rate, liquid cc./min _____ 1.2
Water produced, grams _____ 0.7
Cyclopentanol dehydrated (based on water formed), wt. % _____ 32
Cyclopentanol converted to cyclopentanone (based on analysis as dibenzalcyclopentanone), wt. % _____ 35
Cyclopentanol recovered (based on analysis as phenylurethane), wt. % _____ 23
Cyclopentanol converted to polymer (residue boiling above 150° C.) wt. % _____ 6
Loss, wt. % _____ 4

Inasmuch as the foregoing description comprises preferred embodiments of my invention, it is to be understood that the invention is not limited thereto, and that modifications and changes may be made therein without departing substantially from the scope of the appended claims.

I claim:

1. A process for the production of cyclopentanone by the catalytic dehydrogenation of cyclopentanol, which comprises passing cyclopentanol in vapor phase over a catalyst comprising a copper-zinc alloy having a composition within the range of approximately 30 to approximately 70 per cent by weight of copper and approximately 70 to approximately 30 per cent by weight of zinc at a temperature within the range of approximately 250° to approximately 375° C. and at a space velocity within the range of approximately 1.0 to approximately 3.0.

2. A process for the production of cyclopentanone by the catalytic dehydrogenation of cyclopentanol, which comprises passing cyclopentanol in vapor phase over a catalyst comprising a copper-zinc alloy having a composition within the range of approximately 30 per cent to approximately 70 per cent by weight of copper and approximately 70 to approximately 30 per cent by weight of zinc at a temperature within the range of approximately 290° to approximately 340° C. and at a space velocity within the range of approximately 1.0 to approximately 3.0.

3. A process for the production of cyclopentanone by the catalytic dehydrogenation of cyclopentanol, which comprises passing cyclopentanol in vapor phase over a catalyst comprising a copper-zinc alloy having the following approximate composition: copper, 66% by weight; zinc, 33% by weight; lead, approximately 1% by weight; and tin and nickel in traces, at a temperature within the range of approximately 290° to approximately 340° C. and at a space velocity within the range of approximately 1.0 to approximately 2.0.

4. A process for the production of cyclopentanone by the catalytic dehydrogenation of cyclopentanol, which comprises passing cyclopentanol in vapor phase over a catalyst comprising a copper-zinc alloy having a composition within the range of approximately 30 to approximately 70 per cent by weight of copper and approximately 70 to approximately 30 per cent by weight of zinc at a temperature within the range of approximately 250° to approximately 375° C. and at a space velocity within the range of approximately 1.0 to approximately 3.0, condensing the vaporous dehydrogenation effluent and separating hydrogen therefrom, subjecting the liquid condensate to fractional distillation in a column to separate it into an overhead of the cyclopentene and water content of said effluent and a kettle product containing the cyclopentanone and cyclopentanol content of said effluent, and subjecting said kettle product to fractional distillation in a separate column to separate it into an overhead fraction of the cyclopentanone content of said effluent and a kettle product containing the cyclopentanol content of said effluent.

FREDERICK E. FREY.